United States Patent
Qian et al.

(10) Patent No.: US 8,411,629 B1
(45) Date of Patent: Apr. 2, 2013

(54) DYNAMIC ADMISSION CONTROL OF WIRELESS VIDEO TO A WIRELESS NETWORK

(75) Inventors: Lu Qian, Solon, OH (US); Sandeep J. Shetty, San Jose, CA (US); Neil R. Diener, Hudson, OH (US); Tak Ming Francis Pang, Fremont, CA (US); Rajneesh Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 408 days.

(21) Appl. No.: 12/705,162

(22) Filed: Feb. 12, 2010

Related U.S. Application Data (60) Provisional application No. 61/233,007, filed on Aug. 11, 2009.

(51) Int. Cl.
*H04W 4/00* (2009.01)

(52) U.S. Cl. ......................... 370/329; 370/235

(58) Field of Classification Search .................. 370/329, 370/338, 232, 352, 235, 231; 455/450, 560; 709/224, 223
See application file for complete search history.

(56) References Cited

U.S. PATENT DOCUMENTS

| | | | |
|---|---|---|---|
| 5,884,174 A | 3/1999 | Nagarajan et al. | |
| 6,292,471 B1 | 9/2001 | Cao et al. | |
| 6,459,681 B1 | 10/2002 | Oliva | |
| 6,657,957 B1 | 12/2003 | Cheung et al. | |
| 6,735,172 B1 | 5/2004 | Gibbs et al. | |
| 6,842,618 B2 | 1/2005 | Zhang | |
| 7,106,708 B2 | 9/2006 | Lu | |
| 7,468,951 B2 | 12/2008 | Qian et al. | |
| 7,831,265 B1 * | 11/2010 | Shen et al. | 455/464 |
| 2004/0120293 A1 | 6/2004 | Hassan et al. | |

* cited by examiner

*Primary Examiner* — Chandrahas Patel
(74) *Attorney, Agent, or Firm* — Edell, Shapiro & Finnan, LLC (57) ABSTRACT

Techniques are provided herein for computing a video admission control metric used to determine whether to admit a new video stream to a wireless network. The video admission control metric is computed using several measurable parameters of the wireless network. The dynamic nature of this process takes into account many real-time factors that affect admission control, such as traffic load, channel conditions, and overlapping basic service set (BSS) interference.

21 Claims, 6 Drawing Sheets

DYNAMIC ADMISSION CONTROL OF WIRELESS VIDEO TO A WIRELESS NETWORK

CROSS REFERENCE TO RELATED APPLICATION

This application claims priority to U.S. Provisional Patent Application No. 61/233,007, filed Aug. 11, 2009, the entirety of which is incorporated herein by reference.

TECHNICAL FIELD

The present disclosure relates to managing admission of video traffic to a wireless network.

BACKGROUND

Quality of Service (QoS) is essential for the successful delivery of wireless traffic that is sensitive to latency and packet drop, such as voice and video streams. Wireless video applications have become increasingly popular. In a wireless video application, a wireless network device, such as a wireless network access point or base station device, transmits video traffic to a wireless client device where the video traffic is to be experienced.

For unicast video applications, the video capacity representing the number of video streams that a wireless network access point or base station device can support at a given time on a given channel is limited and varies with many factors. An over-subscription of even a single video stream can cause unacceptable packet latencies or packet loss rates for the other video streams. For multicast wireless video, video capacity is not a problem. However, since the packet loss rate for multicast video is the same as the packet error rate, a common solution is to convert the multicast video into unicast video so that the packet loss rate is reduced by packet re-transmission. The unicast video streams converted from the multicast feed also need to be evaluated for admission control.

DESCRIPTION OF EXAMPLE EMBODIMENTS

Overview

A technique is described herein for a video admission control (AC) metric of additional video streams that can be admitted to a wireless network. The video AC metric is computed using several measurable parameters of the wireless network and is used to admit or reject new wireless video stream traffic in the wireless network. At a wireless network device configured to operate in a wireless network for which video traffic is to be evaluated for admission, measurement data pertaining to existing activity on wireless channel in wireless network is obtained. A request is received for new video traffic to the wireless channel in the wireless network and characteristics of the new video traffic are estimated. The video AC metric is computed based on the characteristics estimated for the video packets of the new video traffic and the measurement data. The video AC metric is then evaluated to determine whether to admit the new video traffic to the wireless channel in the wireless network. In one embodiment, the measurement data comprises a percentage that a wireless channel in the wireless network is busy, a percentage of the wireless channel that is used by voice traffic, a transmit time for video packets for video traffic already in use in the wireless channel, a percentage of the wireless channel that is already used for video traffic, effective data rate for video packets for video traffic already in use in the wireless channel, average packet size of video packets for video traffic already in use in the wireless channel and average number of transmitted video packets for video traffic already in use in the wireless channel.

An advantage of this video AC technique is that it ensures that video streams will not become oversubscribed so that the QoS for the admitted video streams is maintained. The dynamic nature of this process described herein takes into account many real-time factors that affect admission control, such as traffic load, channel conditions, and overlapping basic service set (BSS) interference.

Example Embodiments

Figure 1:
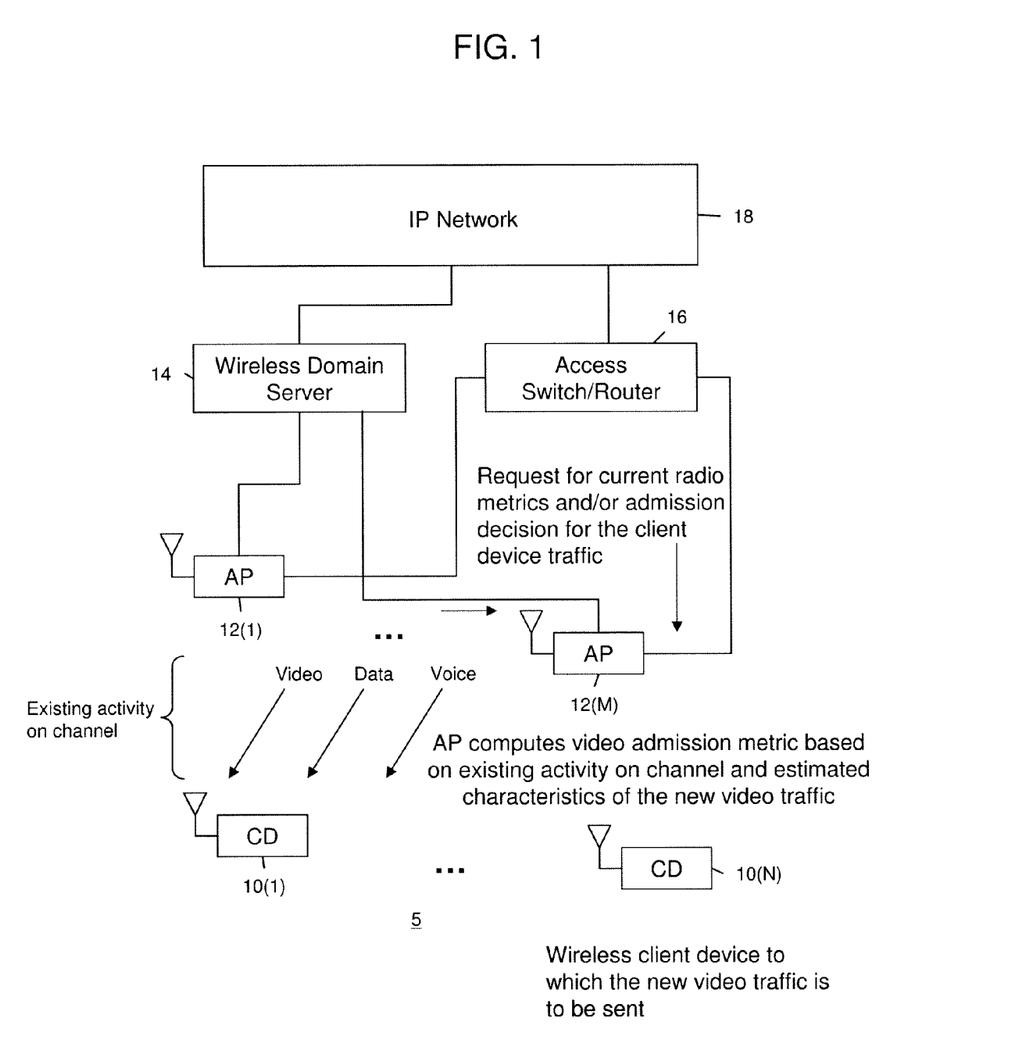
FIG. 1 is an example of a block diagram of a wireless network in which a wireless network access point device is configured to respond to requests for new video traffic to determine whether the new video traffic can be admitted.

FIG. 1 illustrates an example of a wireless communication network 5 in which the video admission control techniques described herein may be employed. The wireless communication network facilitates two-way communication between a plurality of wireless client devices (fixed or portable mobile stations) 10(1)-10(N) and a plurality of wireless network access point (AP) devices 12(1)-12(M). Each of the client devices (CDs) 10(1)-10(N) wirelessly communicates with one of the APs 12(1)-12(M). The CDs 10(1)-10(N) may roam from one AP to another AP.

The CDs 10(1)-10(N) may be cellular telephones, personal digital assistants (PDAs), laptop computers, pagers, multi-network capable wireless communication device (e.g., iPhone™ or Blackberry™ devices) that can communicate with a wide area wireless network (e.g., cellular network) as well as with a wireless local area network (WLAN) and/or a wider area wireless network, such as a WiMAX™ wireless network. The APs 12(1)-12(M) may be any suitable access point or base station device that is used to serve CDs in the wireless network. Moreover, the CDs 10(1)-10(N) may be any other type of wireless devices capable of receiving video, and optionally also voice, video, data, and other wireless services. The APs 12(1)-12(M) connect to a wireless domain server (WDS) 14 and/or to an access switch/router 16, which are in turn connected to a fixed network infrastructure in the form of a Internet Protocol (IP) network (e.g., the Internet) shown at reference numeral 18.

Respective ones of the CDs 10(1)-10(N) are in wireless communication with a corresponding one of the APs 12(1)-12(M) at any given time. The CDs 10(1)-10(N) may also communicate directly with other devices, such as other CDs using suitable wireless communication techniques. FIG. 1 shows that each AP 12(1)-12(M) is in communication with the WDS 14 and the access switch/router 16. While only a single WDS 14 and a single access switch/router 16 are shown in FIG. 1, it should be understand that in an actual network deployment, there are multiple instances of these devices. Multiple APs may report to one WDS 14.

The APs 12(1)-12(M) are coupled to the IP network 18, via a WDS 14 and/or access switch/router 16, and allow CDs 10(1)-10(N) to communicate with other devices coupled to the WLAN. The WLAN may include, for example, access routers, core routers, and other network elements. The network 18 may include any number of subnetworks and routers, and the subnetworks can form a network topology other than LAN, such as a wide area network, an enterprise network, and a metropolitan area network, for example.

It is to be understood that the network shown and described herein is only one example and the techniques described herein may be implemented in any telecommunication network utilizing admission control policies. For example, the method and system described herein may be used with packet data of a wireless network that employs the IEEE 802.11 standard (known commercially as WiFi™) or the IEEE 802.16 standard (known commercially as WiMAX™).

As shown in FIG. 1, an AP, e.g., AP 12(M), receives a request for current radio metrics concerning ability for a wireless channel to support new video traffic for a CD, e.g., CD 10(N), and/or an admission decision for the client traffic. The AP computes a video AC metric based on the traffic currently on a wireless channel (frequency channel) and estimated characteristics of the new video stream (traffic). The request may can directly from the WDS 14 or through the access switch/router 16.

Admission control is useful to maintain QoS for voice and video in a wireless network, such as a WLAN. Compared with voice, video admission control is unique in a number of ways:

Physical (PHY) rate dependency. This PHY rate of the CDs that are receiving the video stream is not ignorable since video packets are relatively long. The PHY rate at which the CD is receiving or sending a video stream is an important factor that influences the amount of over-the-air bandwidth a packet will use. This becomes more important for video than for voice because video packets are typically larger in size. The lower the PHY rate at which the packet is transmitted, the more time it will take to originate from the transmitter and to be consumed by the receiver—and while the transmission or reception is in progress, the over-the-air medium is considered "busy" and thus not available for use by other devices.

Voice co-existence. Since there may be multiple streams of video traffic served by one or more APs, usage allocation of the wireless medium becomes more complicated. This is because variable size video packets could affect timing of the voice packets.

Aggregation of channels in an IEEE 802.11n network. Multiple adjacent channels may be aggregated in order to provide a wider bandwidth channel to accommodate heavy offered loads for video traffic. Whether to use aggregated channels is determined dynamically by overall traffic loads, traffic patterns and channel conditions, making it more difficult to estimate the medium time for a video stream.

Variable bit rates (VBR) video streams. Some video streams have bit rates that vary over time.

Unidirectional. The video traffic is most likely sourced from a server or device connected to the IP network and ultimately to be transmitted in downlink transmissions from an AP to a CD.

Roaming reservation. Because the bandwidth requirement for video is high, reserving bandwidth for roaming CDs would reduce the available bandwidth for active video CDs or the number of video CDs which an AP can support. However, in general, the likelihood that a CD user in the middle of a video application will roam (e.g., walk from one AP coverage area to another AP coverage area, is relatively low. It is more common for a CD to roam while the CD is static and searching for better AP coverage because service through the current AP is weak.

Types of video streams. There are multiple video streams of various video types and applications.

Described herein is an AC metric of additional allowed unicast video streams using some of the considerations that are also used for voice AC, but with taking into account the uniqueness of video applications and services.

Generally, there are two requirements for stable video applications in a wireless network, such as a WLAN. The first is the channel bandwidth requirement and the second is the video packet queuing requirement.

Sufficient bandwidth in the wireless channel is needed to accommodate video packets. The bandwidth requirement is represented by the expressions:

$N*T1 \leq dT*Pvideo \rightarrow N \leq M1$, where $M1=dT*Pvideo/T1$, and where N is the number of admitted unicast video streams (original or converted from multicast), dT is the video packet interval (described further hereinafter), T1 is the average medium time for video packets of admitted streams and Pvideo is the percentage of the average wireless medium occupation time available for video streams.

The video packet queuing requirement refers to the fact that the video packet departure rate in a device (e.g., the AP) that transmits the wireless video packets needs to be no slower than packet arrival rate to that device. The video packet queuing requirement is represented by the expression:

$$N*T1 \leq dT \rightarrow N \leq M2, \text{ where } M2=dT/T1.$$

Thus, the predicted video capacity for a video stream is Nc=min(M1, M2).

The number of additional video streams that can be admitted to a wireless network, represented as an AC metric, is derived as follows.

Channel Band Width Requirement:

$$T1a*Na \leq dTa*(1-P_B-Rvoice+Pvoice) \quad (1)$$

$$T1a*Na \leq dTa*(Rvideo-Pvideo) \quad (2)$$

where:

Na: number of additional unicast video streams to be admitted for a given type of video stream.

dTa: video packet interval for a given video stream to be admitted.

T1a: the average medium time for a given video stream to be admitted.

$P_B$: percentage of the channel that is busy.

Rvoice: the percentage of a wireless channel reserved for voice.

Pvoice: the percentage of a wireless channel used by voice.

Rvideo: the percentage of a wireless channel reserved for video.

Pvideo: the percentage of a wireless channel used by video.

Video Packet Queuing Requirement:

$$N0+Na/dTa \leq 1/T1b \quad (3)$$

where:

N0: average number of transmitted video packets for all the admitted video streams.

T1b=max (T1, T1a).

In equation (1), there is a reservation for voice and in equation (3) multiple streams of various types are taken into account.

A technique for estimating T1a is as follows.

For voice, T1a=T1.

For video, however, two more factors need to be considered:

(1) A newly admitted video stream can introduce more delay for the admitted streams (the video streams already admitted), resulting in more aggregation of video packets and less medium time. Therefore, for the same type of video streams, T1a<T1, so, use of T1a=T1 is conservative and is acceptable.

(2) The CDs for new video streams may have a different PHY rate than the admitted video streams. A correction to T1a for the PHY rate is therefore used.

A technique for correction of T1A is as follows.

T1 and T1a can be expressed as:

$$T1=T0/g+L/r \text{ and } T1a=T0/ga+La/ra, \text{ where}$$

T0: a rate independent constant.

L: average packet size for admitted video streams (video traffic already served by one or more APs in the wireless network).

La: average packet size for new video streams to be admitted.

g: effective aggregation numbers for the admitted streams (already served by one or more APs in the wireless network). That is "g" represents the number of packets that are aggregated in one frame with respect to video streams that are already admitted in the wireless network.

ga: aggregate number for the new video stream(s), that is, the number of packets that are aggregated in one frame for the video stream that is to be considered for admissions to the wireless network.

ra: PHY rate of CD for the video new stream(s).

r: effective PHY rate for the admitted streams, and where 1/r=average of (1/ri) over video packets for admitted streams.

New streams often result in a larger aggregation number, so, g<ga, therefore, T1a<T0/g+L/ra=T1−L/r+La/ra.

Consequently, the following expression can be used as a conservative guide for estimating the average medium time for a new video stream:

$$T1a=T1-L/r+La/ra.$$

The number of additional video streams that can be supported by the wireless network on a given wireless channel is then:

$$Na=\min(Na1,Na2,Na3), \text{ where}$$

$$Na1=dTa*(1-P_B-R\text{voice}+P\text{voice})/T1a.$$

$$Na2=dTa*(R\text{video}-P\text{video})/T1a.$$

$$Na3=dTa/T1b-N0*dTa.$$

If Na>1, a new video stream can be admitted. If Na< or =1, then a new video stream cannot be admitted.

For a variable bit rate (VBR) stream, a cutoff rate Sc with a cumulative distribution function (CDF) P(Sc) may be used as an estimation of the rate of the VBR stream. A conservative method of a smoothed maximum may be used to estimate available bandwidth and bandwidth requirements for a new VBR video stream. For example, min(dTA), max(T1a) and max(La) are useful to estimate the required bandwidth for a new stream in the expressions for Na1, Na2 and Na3 above. In addition, max(Pvideo) and max(N0), over a time window, may be used to estimate available bandwidth. Min and max computations for measurements may be smoothed over a relatively large window size so that past statistics can be phased out gradually in order to favor more recent and relevant statistics.

The following are the measurements made for video AC using the techniques described above:

$P_B$: Percentage that a wireless channel is busy. This is measured by an AP, and includes the time of clear channel access (CCA) busy, the transmit time, the time in back-off, short interframe-space (SIFS) and distributed interframe space (DIFS), before sending a video packet.

Pvoice: Percentage that a wireless channel used is for voice traffic.

T1: Transmission time for video packets. This is measured from the time when a packet gets to the front of the transmit queue in an AP to the time the AP receives an acknowledgment (ACK) packet from a CD. The transmission time is equivalent to delay minus the time a packet in the transmit queue before the packet gets to the front of the transmit queue, and includes the DIFS, transmit time, SIFS, ACK, retries and back-off.

Pvideo: Percentage of a wireless channel used for video traffic.

r: Effective PHY rate (of a CD) for video packets.

L: Average video packet sizes for admitted video streams (video traffic already being served in the wireless network).

La: Estimated video packet sizes for the new video stream to be admitted.

N0: Average number of transmitted video packets for all the admitted video streams (all of the video streams already being served in the wireless network).

The measurements listed above may be averaged over a time window.

Figure 2:
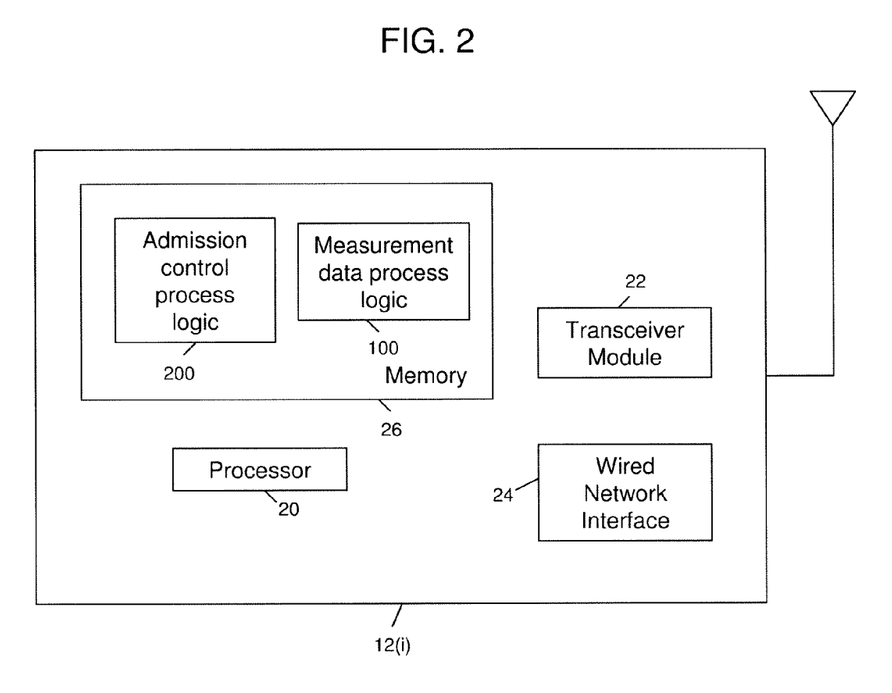
FIG. 2 is an example of a block diagram of a wireless network access point device configured to perform a measurement data process and a video admission control process according to the techniques described herein.

Reference is now made to FIG. 2. FIG. 2 illustrates an example of an AP, generally referred to as AP 12(*i*), and is representative of a block diagram of any of the APs 12(1)-12(M) shown in FIG. 1, that are configured to perform the video admission control techniques described herein. The AP comprises a processor 20, a transceiver module 22 to enable transmit and receive wireless communications with CDs and a wired network interface 24 to enable communications over a wired network, e.g., with the WDS 14 and/or access switch/router 16. The processor 20 is a data processor that is configured to execute programs embodied by instructions stored in memory 26. In addition to instructions for the basis control functions of the AP, the memory 26 stores instructions for measurement data process logic 100 and instructions for admission control process logic 200. The measurement data process logic 100 is described hereinafter in connection with FIG. 3 and the admission control process logic 200 is described hereinafter in connection with FIG. 4.

The processor 20 may be a programmable processor (microprocessor or microcontroller) or a fixed-logic processor. In the case of a programmable processor, the memory 26 is any type of tangible processor readable memory (e.g., random access, read-only, etc.) that is encoded with or stores instructions. Alternatively, the processor 20 may a fixed-logic processing device, such as an application specific integrated circuit or digital signal processor, that is configured with firmware comprised of instructions that cause the processor 20 to perform the functions described herein. Thus, the process logic 100 and 200 may take any of a variety of forms, so as to be encoded in one or more tangible media for execution, such as with fixed logic or programmable logic (e.g., software/computer instructions executed by a processor) and the processor 20 may be a programmable processor, programmable digital logic (e.g., field programmable gate array) or an application specific integrated circuit (ASIC) that comprises fixed digital logic, or a combination thereof. In general, the process logic 100 and 200 may be embodied in a processor readable medium that is encoded with instructions for execution by a processor (e.g., processor 20) that, when executed by the processor, are operable to cause the processor to perform the functions described herein in connection with process logic 100 and 200.

The transceiver module 22 comprises suitable radio frequency (RF) circuits and baseband (e.g., modem) signal processing blocks to facilitate wireless communication over a wireless network. For example, the transceiver module 22 comprises one or more integrated circuit chips configured for wireless communications according to the IEEE 802.11 standard, in the case of a WLAN, or in accordance with the IEEE 802.16 standard, or any other local or wide range wireless network standard now known or hereinafter developed. The wired network interface 24 is, for example, an Ethernet module, to enable wired network communications. The memory 26 may also store packets for processing and ultimate transmission by the AP in the wireless network to CDs.

Figure 3:
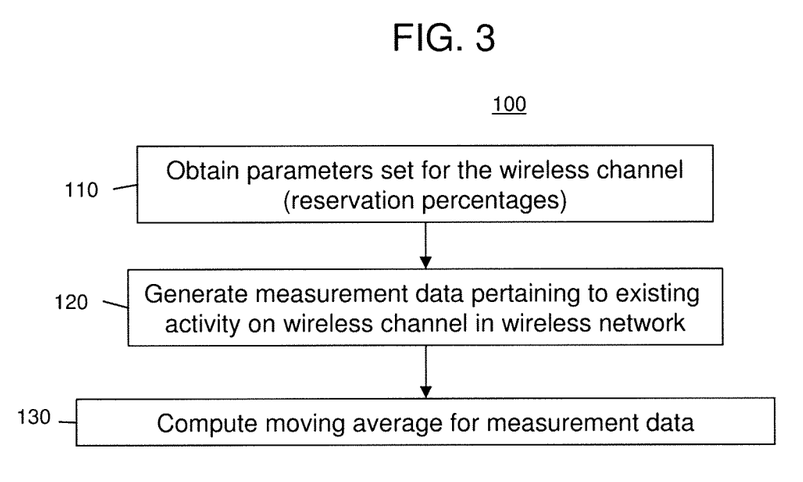
FIG. 3 is an example of a flow chart for the measurement data process.

Reference is now made to FIG. 3 for a description of the measurement data process logic 100. An AP performs the measurement data process logic 100 to compute the data pertaining to existing conditions on a wireless channel of the wireless network. At 110, the AP obtains the network configuration parameters set for the wireless channel. These network configuration parameter are established by a network administrator (or set to default values) and include, for example, Rvoice (the percentage of the wireless channel reserved for voice) and Rvideo (the percentage of the wireless channel reserved for video). At 120, the AP generates the measurement data pertaining to existing activity on a wireless channel in the wireless network, including, for example, $P_B$, Pvoice, Pvideo, T1, N0, L, g and r, as defined above. At 130, the AP computes a moving average of this measurement data (e.g., for $P_B$, Pvoice, Pvideo, T1, N0, L, g, r). The AP makes these measurements by examining packets that it is currently transmitting to CDs for traffic that the AP is currently serving to CDs.

Figure 4:
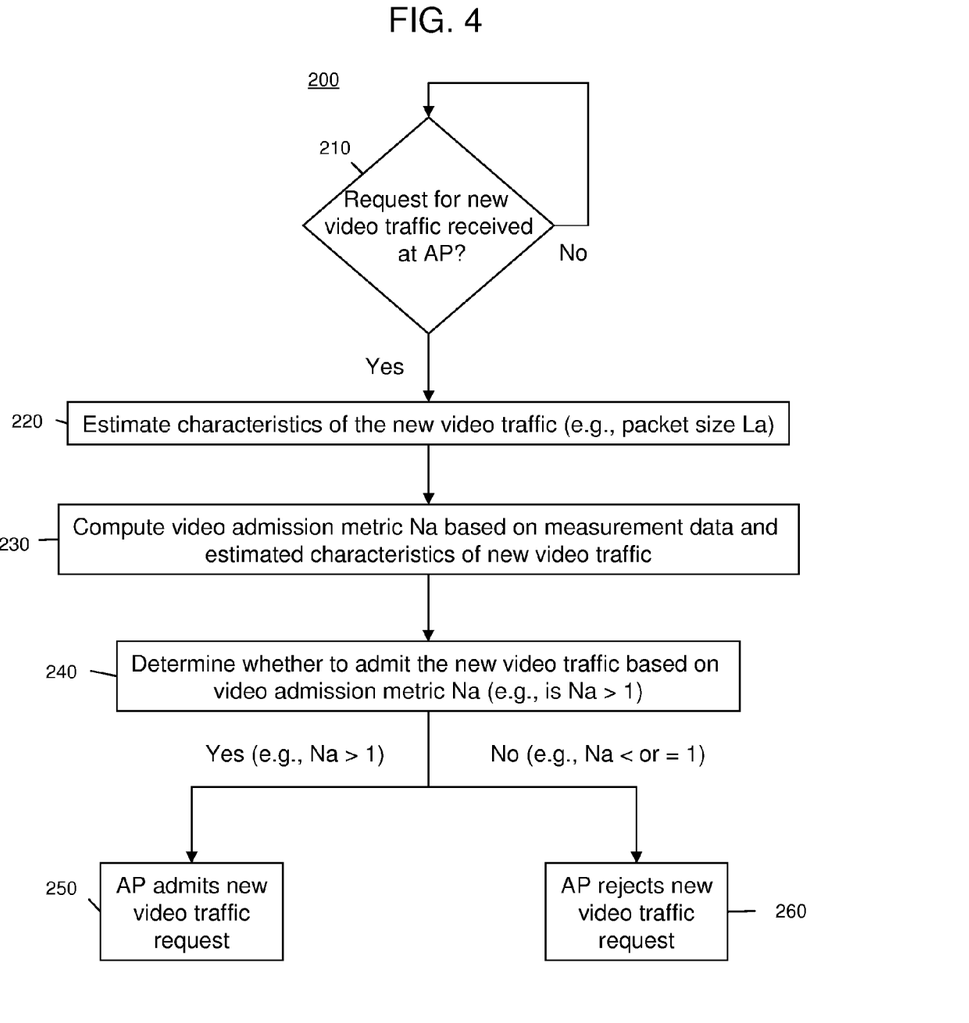
FIG. 4 is an example of a flow chart for the video admission control process.

Turning now to FIG. 4, the admission control process logic 200 is now described. At 210, it is determined whether a request for new video traffic (a new video stream to be served) is received at the AP. For example, a user at a CD may connect to a web site and request to view a video program. The AP that is currently serving that CD will receive the request to admit the new video traffic to that CD either from the CD or from the IP network 18. When a request is received, the process proceeds to 110. At 220, the AP estimates characteristics of the new video traffic, such as packet size La, PHY rate of the CD ra, ga, and T1a, as explained above. The AP may make these estimations by gaining knowledge of the source of the video stream (to thereby determine the type of video stream), and from knowledge the AP already has about various video stream sources and types and knowledge it has gained about the particular CD to which the new video traffic is to be sent. At 230, the AP computes the video AC metric Na based on the measurement data and the estimated characteristics of the new video traffic, using the computation for Na described above. The video AC metric Na is determined by real-time measurable metrics and is therefore highly accurate. Since Na is self-adaptive, it can dynamically adjust to changes in network conditions. At 240, the AP determines whether to admit the new video traffic based on the video AC metric Na. For example, the AP compares the video AC metric Na with a threshold, e.g., 1, and if the value computed for Na is greater than the threshold, the AP admits the new video traffic request at 250 and otherwise it rejects or denies the new video traffic request at 260. When the AP admits the new video traffic stream, it may do so may transmitting on a downlink to the intended destination CD. On the other hand, when the AP rejects a new video traffic stream, it may send a message to the intended destination CD informing it that the wireless network could not accommodate the desired video stream at that time. The message may be presented to the user of the CD.

Figure 5:
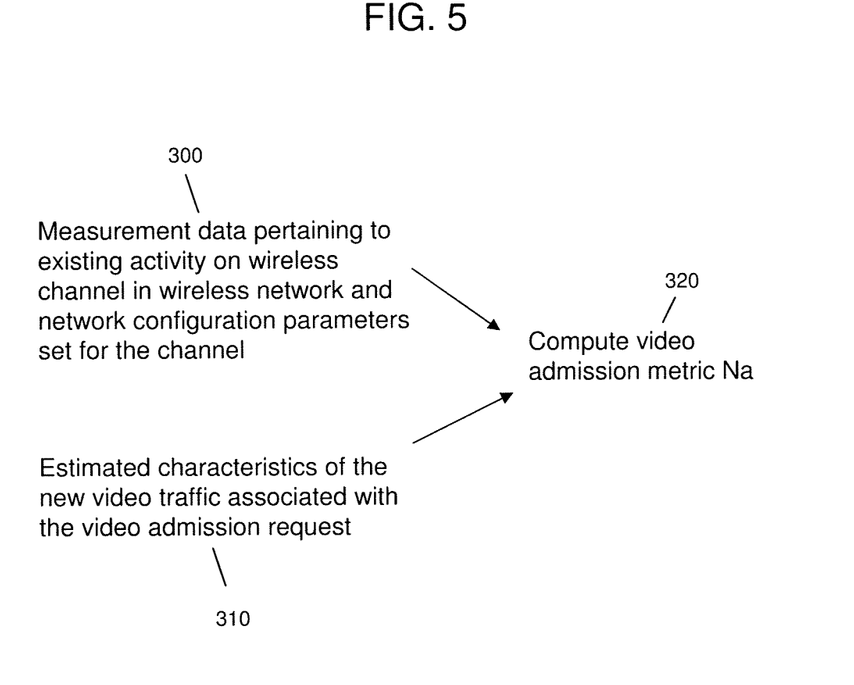
FIG. 5 is a diagram depicting how the measurement data, network configuration parameters and estimated characteristics of the new video traffic are used to compute a video admission metric.

FIG. 5 graphically illustrates how the AP computes the video AC metric. At 300, the AP takes the measurement data pertaining to existing activity on a wireless channel in the wireless network and network configuration parameters set for the channel. At 310, the AP estimates characteristics of the new video traffic associated with the video admission request (e.g., La, etc.). At 320, the AP computes the video AC metric Na from the information determined at 310 and 320.

Figure 6:
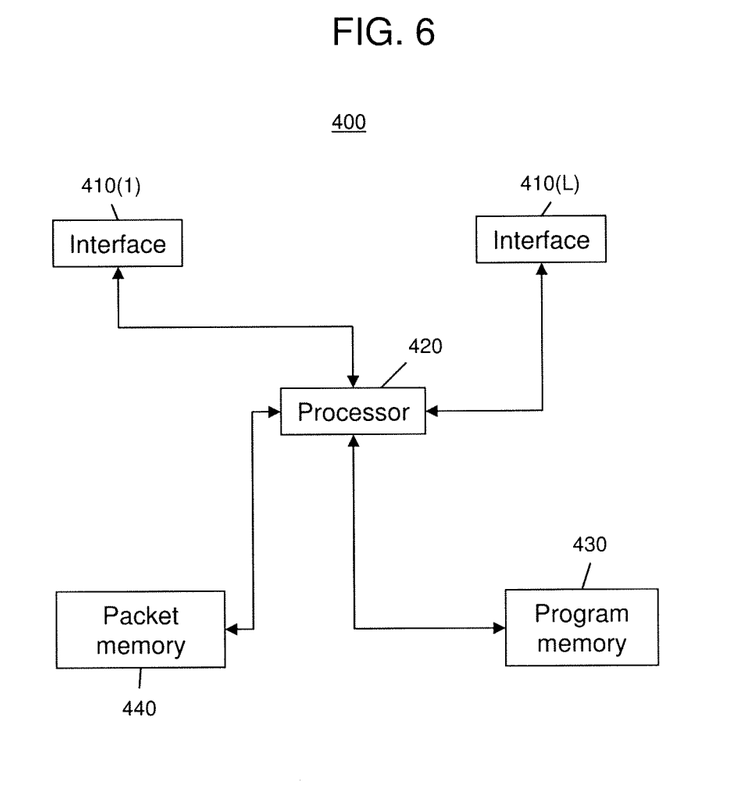
FIG. 6 is an example of a block diagram of a network device that is configured to perform the video admission control process.

The techniques described herein that are performed at the AP may instead be performed at the WDS 14 or some other network controller/management device that connects to the APs 12(1)-12(M). To this end, the process logic 100 and process logic 200 may be embodied in a network control device 400 such as that shown in FIG. 6. The network control device 400 comprises interfaces 410(1)-410(L) that enable communication over a wired or wireless network with APs 12(1)-12(M). A processor 420 is provided that is configured to execute software instructions stored in tangible processor readable memory 430 for process logic 100 and 200. The measurement data may be sent to the network controller 400 from APs 12(1)-12(M) and received via one of the interfaces 410(1)-410(L). Network control device 400 may interface with transmission media via the plurality of interfaces 410(1)-410(L). Program memory 430 can be a volatile computer-readable memory medium. Another form of computer-readable medium storing the process logic is a type of non-volatile storage such as floppy disks, CD-ROMs, DVD-ROMs, hard disks, flash memory, etc. In another form, when the network controller device 400 serves to route the packets to an AP for transmission in the wireless network, the packets are stored in the packet memory 440 for processing and analysis as needed to perform functions of the process logic 100 and 200. Network device 400 shown in FIG. 6 is only one example of a network device with computing capabilities suitable for implementing the techniques described herein. Other devices and systems having different configurations of subsystems may also be utilized.

To summarize, a technique is described herein for a metric of additional allowed video streams, Na, for a wireless network. The video AC metric Na is computed using a number of measurable parameters of a wireless network. An advantage of this video AC technique is that it ensures that video streams will not become oversubscribed so that the QoS for the admitted video streams is maintained. The dynamic nature of this process described herein takes into account many real-time factors that affect admission control, such as traffic load, channel conditions, and overlapping BSS interference.

The techniques described herein may be embodied as a method, and also in an apparatus (e.g., an AP or other network device) and in a processor readable medium that is encoded with instructions that, when executed, cause the processor to perform the functions of the method. In apparatus form, the apparatus comprises a wireless network transceiver configured to transmit and receive signals in one or more wireless channels in a wireless network with one or more wireless client device, and a processor coupled to the wireless network transceiver. The processor is configured to: generate measurement data for pertaining to existing activity on a wireless channel in the wireless network; receive a request to serve new video traffic with a wireless client device operating on the wireless channel in the wireless network; estimate characteristics of the new video traffic; compute a video admission metric based on the characteristics of the new video traffic and the measurement data; and determine whether to admit the new video traffic to the wireless channel in the wireless network based on the video admission metric.

Similarly, in processor readable medium form, the processor readable medium is encoded with instructions that, when executed by a processor, cause the processor to: at a wireless network device configured to operate in a wireless network for which video traffic is to be evaluated for admission, generate measurement data pertaining to existing activity on wireless channel in wireless network; receive a request for new video traffic to the wireless channel in the wireless network; estimate characteristics of the new video traffic; compute a video admission metric based on the characteristics estimated for the video packets of the new video traffic and the measurement data; and determine whether to admit the new video traffic to the wireless channel in the wireless network based on the video admission metric.

The above description is intended by way of example only.

What is claimed is:

1. A method comprising:
at a wireless network access point device configured to operate in a wireless network for which video traffic is to be evaluated for admission and that is configured to serve wireless client devices operating on the wireless channel in the wireless network, obtaining measurement data pertaining to existing activity on a wireless channel in the wireless network;
receiving, at the wireless network access point device, a request for new video traffic to the wireless channel in the wireless network;
receiving, at the wireless network access point device, a request to serve the new video traffic with a wireless client device operating on the wireless channel in the wireless network;
estimating, at the wireless network access point device, characteristics of the new video traffic;
computing, at the wireless network access point device, a video admission metric based on the characteristics estimated for the video packets of the new video traffic and the measurement data; and
determining, at the wireless network access point device, whether to admit the new video traffic to the wireless channel in the wireless network based on the video admission metric.

2. The method of claim 1, wherein obtaining measurement data comprises obtaining data comprising: a percentage that a wireless channel in the wireless network is busy, a percentage of the wireless channel that is used by voice traffic, a transmit time for video packets for video traffic already in use in the wireless channel, a percentage of the wireless channel that is already used for video traffic, effective data rate for video packets for video traffic already in use in the wireless channel, average packet size of video packets for video traffic already in use in the wireless channel and average number of transmitted video packets for video traffic already in use in the wireless channel.

3. The method of claim 2, wherein computing comprises computing the video admission metric Na as a function of Na1, Na2 and Na3, such that Na=min(Na1, Na2, Na3), where Na1=dTa*$(1-P_B-Rvoice+Pvoice)$/T1a, Na2=dTA*(Rvideo−Pvideo)/T1a and Na3=dTa/T1b−N0*dTa, where dtA is an estimated video packet interval for the new video traffic;
T1 is the average medium time for an admitted stream of video packets and T1a is an estimated average medium time for video packets for the new video traffic;
$P_B$ is the percentage that the wireless channel is busy;
Rvoice is the percentage of the wireless channel that is reserved for voice traffic;
Pvoice is the percentage of the wireless channel that is in use for voice traffic;
Rvideo is the percentage of the channel reserved for video traffic;
Pvideo is the percentage of the wireless channel that is in use for video traffic;
T1b=max(T1, T1a); and
N0 is the average number of transmitted video packets for video traffic already in use in the wireless channel.

4. The method of claim 3, and further comprising computing the estimated transmission time T1a for video packets for the new video traffic from the transmission time T1 for video packets for video traffic already in use in the wireless channel according to the computation T1a=T1−L/r+La/ra, where
L is an average packet size for video traffic already in use in the wireless channel;
La is the estimated packet size for video packets of the new video traffic;
r is the effective data rate for video packets for video traffic already in use in the wireless channel; and
ra is an estimated data rate for the new video traffic.

5. The method of claim 4, wherein determining comprises comparing the video admission metric Na with 1, and when the video admission metric is determined to exceed 1, admitting the new video traffic to the wireless network, and otherwise not admitting the new video traffic to the wireless network.

6. The method of claim 5, wherein when the new video traffic has a variable bit rate further comprising applying a smoothing maximum function to the estimated video packet interval for the new video traffic, dTA, to the estimated packet size for the new video traffic, Pvideo, to the percentage of the wireless channel that is in use for video traffic, La and to the average number of transmitted video packets for video traffic already in use in the wireless channel, N0.

7. The method of claim 1, wherein determining comprises comparing the video admission metric with a threshold, and when the video admission metric exceeds the threshold, further comprising admitting the new video traffic to the wireless channel in the wireless network.

8. The method of claim 1, and further comprising averaging the measurement data over a time window, and wherein computing comprises computing the video admission metric based on the averaged measurement data, and wherein estimating characteristics of the new video traffic comprises estimated a packet size of video packets for the new video traffic and the transmission time for video packets in the new video traffic.

9. A wireless network access point comprising:
a wireless network transceiver configured to operate in a wireless network for which video traffic is to be evaluated for admission and that is configured to serve wireless client devices operating on the wireless channel in the wireless network, wherein the wireless transceiver is configured to transmit and receive signals in one or more wireless channels in a wireless network with one or more wireless client devices;
a processor coupled to the wireless network transceiver, wherein the processor is configured to:

obtain measurement data for pertaining to existing activity on a wireless channel in the wireless network;

receive a request to serve new video traffic with a wireless client device operating on the wireless channel in the wireless network;

receive a request to serve the new video traffic with a wireless client device operating on the wireless channel in the wireless network;

estimate characteristics of the new video traffic;

compute a video admission metric based on the characteristics of the new video traffic and the measurement data; and determine whether to admit the new video traffic to the wireless channel in the wireless network based on the video admission metric.

10. The wireless network access point of claim 9, wherein the processor is further configured to compute an average of the measurement data over a time window, and to compute the video admission metric based on the averaged measurement data, and wherein the processor is configured to estimate characteristics of the new video traffic comprising an estimate of a packet size of video packets for the new video traffic and the transmission time for video packets in the new video traffic.

11. The wireless network access point of claim 9, wherein the processor is configured to obtain the measurement data comprising a percentage that a wireless channel in the wireless network is busy, a percentage of the wireless channel that is used by voice traffic, a transmit time for video packets for video traffic already in use in the wireless channel, a percentage of the wireless channel that is already used for video traffic, effective data rate for video packets for video traffic already in use in the wireless channel, average packet size of video packets for video traffic already in use in the wireless channel and average number of transmitted video packets for video traffic already in use in the wireless channel.

12. The wireless network access point of claim 11, wherein the processor is configured to compute the video admission metric Na as a function of Na1, Na2 and Na3, such that Na=min(Na1, Na2, Na3), where $Na1=dTa*(1-P_B-Rvoice+Pvoice)/T1a$, $Na2=dTA*(Rvideo-Pvideo)/T1a$ and $Na3=dTa/T1b-N0*dTa$, where dtA is an estimated video packet interval for the new video traffic;

T1 is the average medium time for an admitted stream of video packets and T1a is an estimated average medium time for video packets for the new video traffic;

$P_B$ is the percentage that the wireless channel is busy;

Rvoice is the percentage of the wireless channel that is reserved for voice traffic;

Pvoice is the percentage of the wireless channel that is in use for voice traffic;

Rvideo is the percentage of the channel reserved for video traffic;

Pvideo is the percentage of the wireless channel that is in use for video traffic;

T1b=max(T1, T1a); and

N0 is the average number of transmitted video packets for video traffic already in use in the wireless channel.

13. The wireless network access point of claim 12, wherein the processor is configured to compute the estimated transmission time T1a for video packets for the new video traffic from the transmission time T1 for video packets for video traffic already in use in the wireless channel according to the computation T1a=T1−L/r+La/ra, where L is an average packet size for video traffic already in use in the wireless channel;

La is the estimated packet size for video packets of the new video traffic;

r is the effective data rate for video packets for video traffic already in use in the wireless channel; and ra is an estimated data rate for the new video traffic.

14. The wireless network access point of claim 13, wherein the processor is configured to compare the video admission metric Na with 1, and when the video admission metric is determined to exceed 1, to admit the new video traffic to the wireless network, and otherwise to not admit the new video traffic to the wireless network.

15. The wireless network access point of claim 14, wherein when the new video traffic has a variable bit rate, the processor is configured to apply a smoothing maximum function to the estimated video packet interval for the new video traffic, dTA, to the estimated packet size for the new video traffic, Pvideo, to the percentage of the wireless channel that is in use for video traffic, La and to the average number of transmitted video packets for video traffic already in use in the wireless channel, N0.

16. A non-transitory processor readable medium encoded with instructions that, when executed by a processor, cause the processor to:

at a wireless network access point device configured to operate in a wireless network for which video traffic is to be evaluated for admission and that is configured to serve wireless client devices operating on the wireless channel in the wireless network, obtain measurement data pertaining to existing activity on wireless channel in wireless network;

receive, at the wireless network access point device, a request for new video traffic to the wireless channel in the wireless network;

receive, at the wireless network access point device, a request to serve the new video traffic with a wireless client device operating on the wireless channel in the wireless network;

estimate, at the wireless network access point device, characteristics of the new video traffic;

compute, at the wireless network access point device, a video admission metric based on the characteristics estimated for the video packets of the new video traffic and the measurement data; and determine, at the wireless network access point device, whether to admit the new video traffic to the wireless channel in the wireless network based on the video admission metric.

17. The processor readable medium of claim 16, wherein the instructions that cause the processor to obtain the measurement data comprises instructions to generate a percentage that a wireless channel in the wireless network is busy, a percentage of the wireless channel that is used by voice traffic, a transmit time for video packets for video traffic already in use in the wireless channel, a percentage of the wireless channel that is already used for video traffic, effective data rate for video packets for video traffic already in use in the wireless channel, average packet size of video packets for video traffic already in use in the wireless channel and average number of transmitted video packets for video traffic already in use in the wireless channel.

18. The processor readable medium of claim 17, wherein the instructions that cause the processor to determine comprise instructions that cause the processor to compare the video admission metric Na with 1, and when the video admission metric is determined to exceed 1, to admit the new video traffic to the wireless network, and otherwise to not admit the new video traffic to the wireless network.

19. The processor readable medium of claim 17, wherein the instructions that cause the processor to compute the video admission metric comprise instructions that cause the processor to compute the video admission metric Na as a function of Na1, Na2 and Na3, such that Na=min(Na1, Na2, Na3), where Na1=dTa*(1−$P_B$−Rvoice+Pvoice)/T1a, Na2=dTA*(Rvideo−Pvideo)/T1a and Na3=dTa/T1b−N0*dTa, where
- dtA is an estimated video packet interval for the new video traffic;
- T1 is the average medium time for an admitted stream of video packets and T1a is an estimated average medium time for video packets for the new video traffic;
- $P_B$ is the percentage that the wireless channel is busy;
- Rvoice is the percentage of the wireless channel that is reserved for voice traffic;
- Pvoice is the percentage of the wireless channel that is in use for voice traffic;
- Rvideo is the percentage of the channel reserved for video traffic;
- Pvideo is the percentage of the wireless channel that is in use for video traffic;
- T1b=max(T1, T1a); and
- N0 is the average number of transmitted video packets for video traffic already in use in the wireless channel.

20. The processor readable medium of claim 19, and further comprising instructions that cause the processor to compute the estimated transmission time T1a for video packets for the new video traffic from the transmission time T1 for video packets for video traffic already in use in the wireless channel according to the computation T1a=T1−L/r+La/ra, where
- L is an average packet size for video traffic already in use in the wireless channel;
- La is the estimated packet size for video packets of the new video traffic;
- r is the effective data rate for video packets for video traffic already in use in the wireless channel; and
- ra is an estimated data rate for the new video traffic.

21. The processor readable medium of claim 19, and further comprising instructions that, when the new video traffic has a variable bit rate, cause the processor to apply a smoothing maximum function to the estimated video packet interval for the new video traffic, dTA, to the estimated packet size for the new video traffic, Pvideo, to the percentage of the wireless channel that is in use for video traffic, La and to the average number of transmitted video packets for video traffic already in use in the wireless channel, N0.

* * * * *